US011316168B2

(12) United States Patent
Lee et al.

(10) Patent No.: US 11,316,168 B2
(45) Date of Patent: Apr. 26, 2022

(54) FLEXIBLE SECONDARY BATTERY (71) Applicant: LG Energy Solution, Ltd., Seoul (KR)

(72) Inventors: Jae-Hyun Lee, Daejeon (KR); In-Sung Uhm, Daejeon (KR); Sung-Joong Kang, Daejeon (KR); Dong-Chan Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/331,024

(22) PCT Filed: Dec. 11, 2017

(86) PCT No.: PCT/KR2017/014489
§ 371 (c)(1),
(2) Date: Mar. 6, 2019

(87) PCT Pub. No.: WO2018/106093
PCT Pub. Date: Jun. 14, 2018

(65) Prior Publication Data
US 2019/0267633 A1 Aug. 29, 2019

(30) Foreign Application Priority Data
Dec. 9, 2016 (KR) .................. 10-2016-0167907

(51) Int. Cl.
*H01M 4/00* (2006.01)
*H01M 4/78* (2006.01)
(Continued)

(52) U.S. Cl.
CPC ............. *H01M 4/78* (2013.01); *H01M 4/366* (2013.01); *H01M 4/628* (2013.01);
(Continued)

(58) Field of Classification Search
CPC .................................. H01M 4/78; H01M 2/14
See application file for complete search history.

(56) References Cited

U.S. PATENT DOCUMENTS

| 2012/0015239 A1 | 1/2012 | Kwon et al. |
| 2012/0023975 A1 | 2/2012 | Yoon et al. |

(Continued)

FOREIGN PATENT DOCUMENTS

| CN | 103003993 A | 3/2013 |
| CN | 103155228 A | 6/2013 |

(Continued)

OTHER PUBLICATIONS

Machine Translation of WO-2014021691-A1 (Year: 2014).*
(Continued)

*Primary Examiner* — Milton I Cano
*Assistant Examiner* — Mary G Henshaw
(74) *Attorney, Agent, or Firm* — Lerner, David, Littenberg, Krumholz & Mentlik, LLP (57) ABSTRACT

A flexible secondary battery includes: a first electrode including a first electrode current collector extended longitudinally, a first electrode active material layer formed on the outside of the first electrode current collector, and a first insulation coating layer formed on the outside of the first electrode active material layer; and a second electrode including a second electrode current collector extended longitudinally, a second electrode active material layer formed on the outside of the second electrode current collector, and a second insulation coating layer formed on the outside of the second electrode active material layer, wherein the first electrode and the second electrode are wound in such a manner that they are disposed alternately in contact with each other.

17 Claims, 7 Drawing Sheets

(51) Int. Cl.
   *H01M 4/36*   (2006.01)
   *H01M 4/62*   (2006.01)
   *H01M 10/0587*   (2010.01)
   *H01M 4/02*   (2006.01)
   *H01M 4/13*   (2010.01)

(52) U.S. Cl.
   CPC .......... *H01M 10/0587* (2013.01); *H01M 4/02* (2013.01); *H01M 4/13* (2013.01); *H01M 2004/025* (2013.01)

(56) References Cited

U.S. PATENT DOCUMENTS

| | | | |
|---|---|---|---|
| 2012/0148902 | A1 | 6/2012 | Kwon et al. |
| 2013/0149580 | A1 | 6/2013 | Kim |
| 2014/0030569 | A1 | 1/2014 | Kwon et al. |
| 2014/0199568 | A1 | 7/2014 | Kwon et al. |
| 2016/0020483 | A1 | 1/2016 | Porthault et al. |
| 2019/0058223 | A1 | 2/2019 | Uhm et al. |

FOREIGN PATENT DOCUMENTS

| | | | | |
|---|---|---|---|---|
| CN | 103346356 | A | 10/2013 | |
| CN | 103904357 | A | 7/2014 | |
| CN | 105047999 | A | 11/2015 | |
| EP | 2605314 | B1 | 12/2018 | |
| JP | H10247520 | A | 9/1998 | |
| JP | 2001325951 | A | 11/2001 | |
| JP | 2003208918 | A | 7/2003 | |
| JP | 2006244921 | A | 9/2006 | |
| JP | 2013535802 | A | 9/2013 | |
| JP | 2016091858 | A | 5/2016 | |
| KR | 20070009231 | A | 1/2007 | |
| KR | 100742739 | B1 | 7/2007 | |
| KR | 20110089584 | A | 8/2011 | |
| KR | 101072292 | B1 | 10/2011 | |
| KR | 101363388 | B1 | 2/2014 | |
| KR | 20140054131 | A | 5/2014 | |
| KR | 101465169 | B1 | 11/2014 | |
| KR | 101530678 | B1 | 6/2015 | |
| KR | 20160055755 | A | 5/2016 | |
| WO | WO-2014021691 | A1 * | 2/2014 | ............ H01M 4/139 |
| WO | 2018111016 | A1 | 6/2018 | |

OTHER PUBLICATIONS

Extended European Search Report for Application No. EP17877575.5 dated Sep. 25, 2019, pp. 1-3.
Search report from International Application No. PCT/KR2017/014489, dated Apr. 11, 2018.
Chinese Search Report for Application No. 201780065285.9 dated Sep. 8, 2021, 3 pages.

\* cited by examiner

FLEXIBLE SECONDARY BATTERY

CROSS-REFERENCE TO RELATED APPLICATIONS

The present application is a national phase entry under 35 U.S.C. § 371 of International Application No. PCT/KR2017/014489, filed Dec. 11, 2017, published in Korean, which claims priority to Korean Patent Application No. 10-2016-0167907, filed Dec. 9, 2016 in the Republic of Korea, the disclosures of which are incorporated herein by reference.

TECHNICAL FIELD

The present disclosure relates to a flexible secondary battery. More particularly, the present disclosure relates to a flexible secondary battery which is freely deformable and has improved flexibility.

BACKGROUND ART

Recently, development of wireless communication technology leads popularization of mobile devices. In response to such development of wireless technology, there is a strong tendency to use secondary batteries essentially as power sources for devices. Meanwhile, with a view to prevention of environmental pollution, electric vehicles and hybrid vehicles have been developed and secondary batteries have been used as power sources for such vehicles.

Thus, secondary batteries have been increasingly in use in various industrial fields. Depending on characteristics of applications, secondary batteries have been diversified in terms of output, capacity and structure.

In general, a secondary battery includes an electrode assembly obtained by applying an active material to the surface of a plate-like current collector to form a cathode and an anode and interposing a separator between the cathode and the anode. The electrode assembly is received generally in a cylindrical or prismatic metallic can or a pouch type casing including an aluminum sheet together with a liquid electrolyte or solid electrolyte. In addition, the electrode assembly may have a jelly-roll shape in which sheet-type cathodes/separators/anodes are wound, or a structure in which a plurality of unit electrodes having a thin plate shape are stacked successively. Therefore, the structure of an electrode (cathode and anode) in the electrode assembly essentially has a plate-like shape.

Such a plate-like electrode structure is advantageous in that it can realize a high degree of integration upon winding or stacking of an electrode assembly. However, it has a limitation in structural deformation depending on needs in industrial fields. In addition, such a plate-like electrode structure has some problems, since it is sensitive to a change in volume of an electrode during charging/discharging, does not allow easy emission of gases generated in a cell toward the outside, and may cause a large difference in potential from one electrode to another electrode.

Particularly, in response to various demands of consumers, devices using a secondary battery have been diversified and designs of such devices have become important. Contrary to this, it is required to provide a separate site or space where a secondary battery having a classical structure and/or shape (cylindrical, prismatic or pouch shape) is installed for devices having a specific shape. This may be a significant disadvantage in terms of extension of wireless technology or limitation in designs. For example, when a space configured to install a secondary battery is narrow and elongated in a newly developed device, it is not possible or efficient to install a secondary battery including such a conventional electrode assembly based on a plate-like electrode after it is deformed structurally. In other words, since a cylindrical battery, coin battery or prismatic battery has a specific shape, it is not freely deformable, has a limitation in use, and is not amenable to free deformation, such as distortion or bending, in response to the purpose of use a battery.

DISCLOSURE

Technical Problem

The present disclosure is designed to solve the problems of the related art, and therefore the present disclosure is directed to providing a flexible secondary battery which is easily deformable and has an improved structure so as to maintain the stability and high performance of a second battery.

Technical Solution

In one aspect of the present disclosure, there is provided the flexible batteries according to the following embodiments.

According to a first embodiment of the present disclosure, there is provided a flexible secondary battery which includes:

a first electrode including a first electrode current collector extended longitudinally, a first electrode active material layer formed on an outside of the first electrode current collector, and a first insulation coating layer formed on an outside of the first electrode active material layer; and a second electrode including a second electrode current collector extended longitudinally, a second electrode active material layer formed on an outside of the second electrode current collector, and a second insulation coating layer formed on an outside of the second electrode active material layer, wherein the first electrode and the second electrode are helically wound in contact with each other such that they are disposed alternately in parallel with each other on the same circumference.

According to a second embodiment of the present disclosure, there is provided the flexible secondary battery of the first embodiment, wherein each of the first electrode current collector and the second electrode current collector independently includes: stainless steel; aluminum; nickel; titanium; baked carbon; copper; stainless steel surface-treated with carbon, nickel, titanium or silver; aluminum-cadmium alloy; non-conductive polymer surface-treated with a conductive material; conductive polymer; metal paste containing metal powder of Ni, Al, Au, Ag, Al, Pd/Ag, Cr, Ta, Cu, Ba or ITO; or carbon paste containing carbon powder of graphite, carbon black or carbon nanotube.

According to a third embodiment of the present disclosure, there is provided the flexible secondary battery of the first or the second embodiment, wherein the first electrode is a cathode or anode and the second electrode is an anode or cathode corresponding to the first electrode.

According to a fourth embodiment of the present disclosure, there is provided the flexible secondary battery of any one of the first to the third embodiments, wherein when the first electrode is an anode and the second electrode is a cathode, the first electrode active material includes any one active material particle selected from the group consisting of natural graphite, artificial graphite or carbonaceous materials; metals (Me) of lithium-containing titanium composite oxide (LTO), Si, Sn, Li, Zn, Mg, Cd, Ce, Ni or Fe; alloys including the metal (Me); oxides (MeOx) of the metals (Me); and composites of the metals (Me) with carbon, or a combination of two or more of them, and the second electrode active material includes any one active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic fraction of an element forming the oxide and $0 \leq x < 0.5$, $0 \leq y < 0.5$, $0 \leq z < 0.5$ and $0 < x+y+z \leq 1$), or a combination of two or more of them.

According to a fifth embodiment of the present disclosure, there is provided the flexible secondary battery of any one of the first to the fourth embodiments, wherein when the first electrode is a cathode and the second electrode is an anode, the first electrode active material includes any one active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic fraction of an element forming the oxide and $0 \leq x < 0.5$, $0 \leq y < 0.5$, $0 \leq z < 0.5$ and $0 < x+y+z \leq 1$), or a combination of two or more of them, and the second electrode active material includes any one active material particle selected from the group consisting of natural graphite, artificial graphite or carbonaceous materials; metals (Me) of lithium-containing titanium composite oxide (LTO), Si, Sn, Li, Zn, Mg, Cd, Ce, Ni or Fe; alloys including the metal (Me); oxides (MeOx) of the metals (Me); and composites of the metals (Me) with carbon, or a combination of two or more of them.

According to a sixth embodiment of the present disclosure, there is provided the flexible secondary battery of any one of the first to the fifth embodiments, wherein each of the first insulation coating layer and the second insulation coating layer independently includes a porous polymer coating layer; an inorganic solid-state electrolyte coating layer; an organic solid-state coating layer; or a polyolefin foam separator.

According to a seventh embodiment of the present disclosure, there is provided the flexible secondary battery of any one of the first to the sixth embodiments, which includes a third insulation coating layer surrounding both the first electrode and the second electrode.

According to an eighth embodiment of the present disclosure, there is provided the flexible secondary battery of any one of the first to the seventh embodiments, wherein the third insulation coating layer includes a porous polymer coating layer; an inorganic solid-state electrolyte coating layer; an organic solid-state coating layer; or a polyolefin foam separator.

Advantageous Effects

The flexible secondary battery according to an embodiment of the present disclosure includes the first electrode and the second electrode, which have a longitudinally extended shape and are disposed alternately in contact with each other, and thus can improve the flexibility of the battery. Therefore, it is possible to reduce the risk of a short-circuit caused by deformation, unlike a foil type electrode which may form a sharp portion by deformation to cause a short-circuit.

In addition, since the electrodes wound in the flexible secondary battery according to an embodiment of the present disclosure are easily deformable, the force applied to the electrode active material layers may be dispersed, thereby contributing to prevention of the separation of an active material layer from a current collector.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, the present disclosure will be described in detail with reference to the accompanying drawings. It should be understood that the constitution shown in the drawings is just a preferable example for the purpose of illustrations only, not intended to limit the scope of the disclosure, so it should be understood that other equivalents and modifications could be made thereto without departing from the scope of the disclosure.

The flexible secondary battery according to an embodiment of the present disclosure includes: a first electrode including a first electrode current collector extended longitudinally, a first electrode active material layer formed on an outside of the first electrode current collector, and a first insulation coating layer formed on an outside of the first electrode active material layer; and a second electrode including a second electrode current collector extended longitudinally, a second electrode active material layer formed on an outside of the second electrode current collector, and a second insulation coating layer formed on an outside of the second electrode active material layer, wherein the first electrode and the second electrode are helically wound in contact with each other such that they are disposed alternately in parallel with each other on the same circumference.

Figure 1:
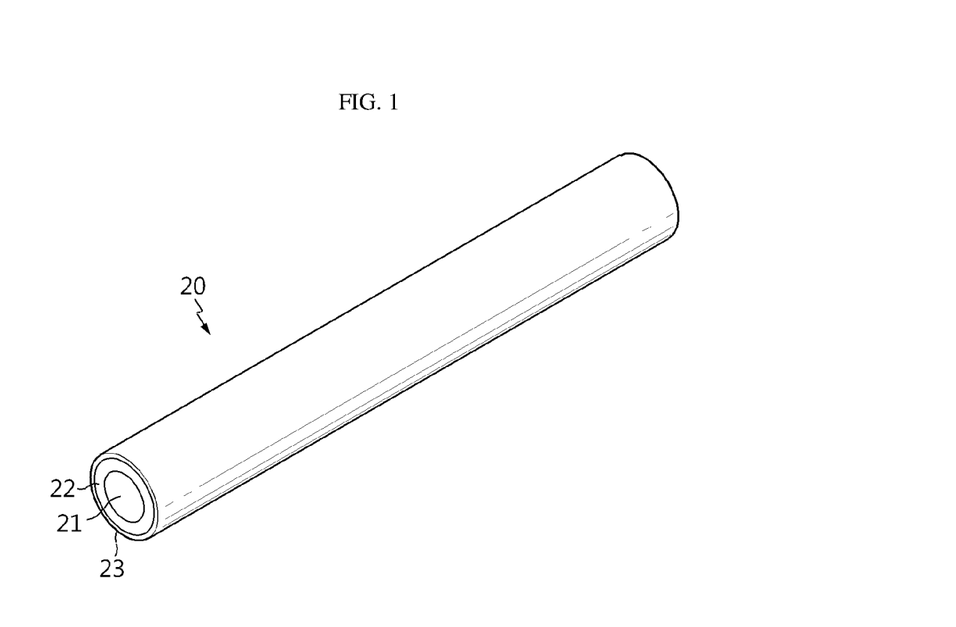
FIG. 1 is a schematic view illustrating the electrode according to an embodiment of the present disclosure.

Referring to FIG. 1, each of the electrodes (the first electrode and the second electrode) in the flexible secondary battery according to the present disclosure is provided with an electrode current collector 21 extended longitudinally, an electrode active material layer 22 formed on the outside of the electrode current collector 21, and an insulation coating layer 23 formed on the outside of the first electrode active material layer 22.

Figure 2:
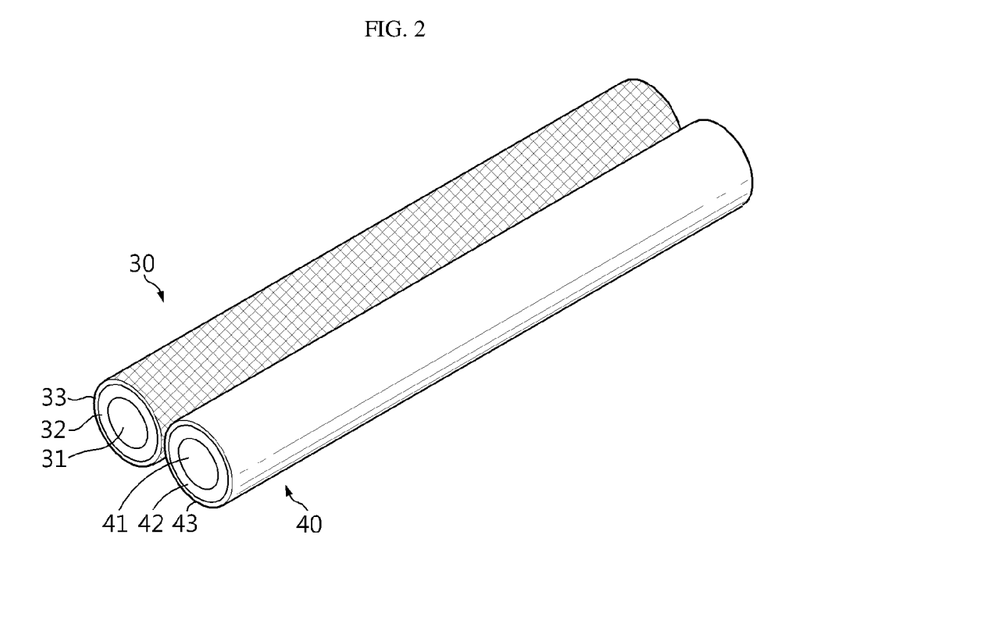
FIG. 2 is a schematic view illustrating the flexible secondary battery including two electrodes according to an embodiment of the present disclosure, before it is manufactured.
Figure 3:
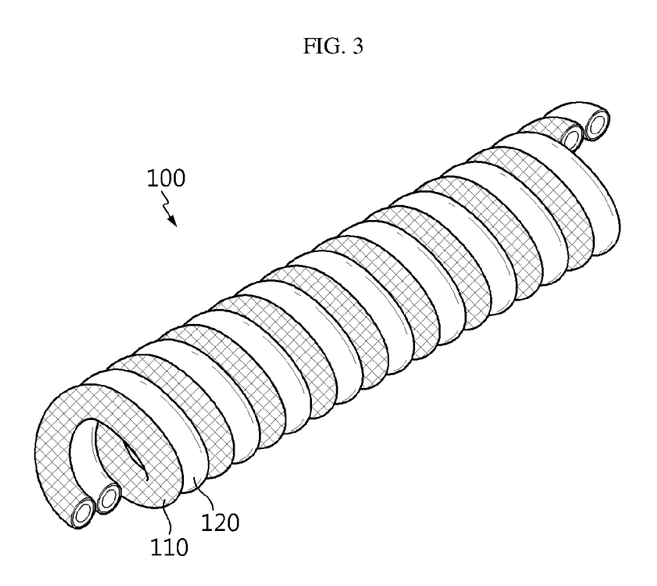
FIG. 3 is a schematic view illustrating the flexible secondary battery according to an embodiment of the present disclosure.

Referring to FIG. 2 and FIG. 3, a first electrode 30 including a first electrode current collector 31 extended longitudinally, a first electrode active material layer 32 formed on the outside of the first electrode current collector 31, and a first insulation coating layer 33 formed on the outside of the first electrode active material layer 32; and a second electrode 40 including a second electrode current collector 41 extended longitudinally, a second electrode active material layer 42 formed on the outside of the second electrode current collector 41, and a second insulation coating layer 43 formed on the outside of the second electrode active material layer 42 are prepared, and then the first electrode 30, 110 and the second electrode 40, 120 are wound so that they may be disposed alternately in contact with each other. In this manner, it is possible to form the flexible secondary battery 100 according to the present disclosure.

In the flexible secondary battery according to the present disclosure, the first electrode and the second electrode are extended longitudinally, and have a structure in which they are wound spirally so that they are disposed alternately in contact with each other. Herein, the term 'spiral' may be interchanged with 'helix', means a shape which winds diagonally in a certain range, and generally refers to a shape similar to the shape of a general spring.

In the flexible secondary battery according to the present disclosure, it does not have a concentric circular shape in which one of the first electrode and the second electrode is disposed at the inside and the other is disposed at the outside so that one electrode is surrounded with the other electrode present at the outside, but has a shape in which the first electrode and the second electrode are aligned alternately in parallel with each other on the same circumference.

In the battery structure including an internal electrode and an external electrode surrounding the same according to the related art, a separator layer (separator, electrolyte layer, etc.) is disposed between the internal electrode and the external electrode in order to impart insulation property between both electrodes. However, a space is present while the external electrode surrounds the internal electrode. Particularly, when bending is repeated under the application of external force to the battery, the internal electrode and the external electrode show a different range of extension/shrinking due to their different bending radii, friction occurs while they are spaced apart from each other to release stress, and the separator may be damaged or the electrode active material may be separated, resulting in generation of a short-circuit undesirably between the electrodes at such a spaced portion.

In addition, in the case of a battery including a first electrode structure having a linear or spiral shape and a second electrode structure surrounding the outside of the first electrode structure according to the related art, flexibility is degraded due to the portion where the first electrode structure and the second electrode structure are in contact with each other while the former is surrounded with the latter. In addition, while bending occurs repeatedly, the portion impairs the separator due to the friction of the portion or damages the electrode structures due to the separation of the electrode active material.

On the contrary, in the flexible secondary battery according to the present disclosure, the surfaces (winding surfaces) on which the first electrode and the second electrode are wound are disposed on the same circumferential surface, and thus the electrodes move within the same bending radius upon the bending of the battery, thereby preventing stimulation in the vertical direction. In addition, since the first electrode and the second electrode of the flexible secondary battery according to the present disclosure are disposed in contact with each other, flexibility is improved significantly, thereby preventing the insulation coating layers from being damaged by the friction of the first insulating layer and the second insulating layer, even when the battery is subjected to bending repeatedly. Therefore, it is possible to prevent short-circuit between electrodes, which occurs in the above-mentioned battery structures according to the related art.

The cross-section of the first electrode current collector and that of the second electrode current collector are not particularly limited but may have a circular, ellipsoidal or polygonal shape, and particular examples of the polygonal shape may include a triangular, quadrangular or hexagonal shape.

Each of the first electrode current collector and the second electrode current collector may be prepared preferably by using stainless steel, aluminum, nickel, titanium, baked carbon, copper, stainless steel surface-treated with carbon, nickel, titanium or silver, aluminum-cadmium alloy, a non-conductive polymer surface-treated with a conductive material, or a conductive polymer.

The current collector functions to collect the electrons generated by the electrochemical reaction of an electrode active material or to supply the electrons required for electrochemical reaction. In general, a metal, such as copper or aluminum is used as a current collector. Particularly, when using a polymer conductor including a conductive polymer or a non-conductive polymer surface-treated with a conductive material, it is possible to obtain relatively higher flexibility as compared to a metal such as copper or aluminum. In addition, it is possible to accomplish the weight lightening of a battery by using a polymer current collector instead of a metal current collector.

Conductive materials that may be used include polyacetylene, polyaniline, polypyrrole, polythiophene, polysulfur nitride, indium tin oxide (ITO), copper, silver, palladium and nickel. Conductive polymers that may be used include polyacetylene, polyaniline, polypyrrole, polythiophene and polysulfur nitride. However, the non-conductive polymer used for a current collector is not particularly limited.

The first electrode may be a cathode and the second electrode may be an anode. Otherwise, the first electrode may be an anode and the second electrode may be a cathode. Therefore, it is possible to select a material for the first electrode active material layer or the second electrode active material layer adequately depending on the particular type of each electrode.

When the first electrode is an anode and the second electrode is a cathode, the first electrode active material layer becomes an anode active material layer, and non-limiting examples thereof include natural graphite, artificial graphite or carbonaceous materials; metals (Me) such as lithium-containing titanium composite oxide (LTO), Si, Sn, Li, Zn, Mg, Cd, Ce, Ni or Fe; alloys including the metal (Me); oxides (MeOx) of the metals (Me); composites of the metals (Me) with carbon; or the like. In addition, the second electrode active material layer becomes a cathode active material layer, and non-limiting examples thereof include $LiCoO_2$, $LiNiO_2$, $LiMn_2O_4$, $LiCoPO_4$, $LiFePO_4$, $LiNiMn-CoO_2$, $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic fraction of an element forming the oxide and $0 \leq x<0.5$, $0 \leq y<0.5$, $0 \leq z<0.5$ and $0<x+y+z \leq 1$), or the like.

In addition, when the first electrode is a cathode and the second electrode is an anode, the first electrode active material layer becomes a cathode active material layer and the second electrode active material layer becomes an anode active material layer.

The electrode active material layer further includes a binder and a conductive material, besides the electrode active materials, and may be bound with the current collector to form an electrode. Such a binder allows binding of the electrode active material to the current collector to prevent separation, when the electrode is deformed by folding or severe bending due to external force.

The conductive material may include any one selected from the group consisting of carbon black, acetylene black, Ketjen black, carbon fiber, carbon nanotube and graphene, or a combination of two or more of them, but is not limited thereto.

The binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof, but is not limited thereto.

In addition, each of the first electrode and the second electrode of the flexible secondary battery according to the present disclosure is provided with an insulation coating layer (first insulation coating layer, second insulation coating layer) at the outside of each electrode active material layer.

The insulation coating layer functions as an electrical insulation layer which prevents a short-circuit between the first electrode and the second electrode even when both electrodes are disposed alternately in contact with each other, as well as functions to form a channel through which lithium ions can be transported between both electrodes.

Further, the insulation coating layer functions as a protective coating layer which prevents separation of the active material of the active material layer by imparting flexibility to the electrode, even when the electrode is bent severely.

As a result, in the flexible secondary battery according to the present disclosure, it is possible to eliminate a separator layer (separator or electrolyte), which, otherwise, should be interposed between an internal electrode and an external electrode in the conventional battery having a structure of an internal electrode and an external electrode surrounding the same.

In addition, the flexible secondary battery according to the present disclosure is freely deformable and has a certain degree of elasticity by virtue of the presence of such insulation coating layers, and thus has excellent flexibility. Further, while a currently used foil type electrode forms a sharp portion by deformation and the portion may infiltrate into an electrolyte layer to cause a short-circuit, the flexible secondary battery according to the present disclosure is not easily folded or bent and is not susceptible to formation of a sharp portion upon deformation to prevent the problem of a short-circuit.

According to an embodiment of the present disclosure, each of the first insulation coating layer and the second insulation coating layer independently includes a porous polymer coating layer; inorganic solid-state electrolyte coating layer; organic solid-state coating layer; or a polyolefin foam separator.

The porous polymer coating layer is a polymer film having pores formed by a phase separation of a polymer, and particular examples of the polymer include polyvinylidene fluoride (PVDF), polyvinylidene fluoride-co-hexafluoropropylene, polyvinylidene fluoride-co-trichloroethylene, or the like.

The inorganic solid-state coating layer is a coating layer formed by applying a solid electrolyte composition including an inorganic solid electrolyte and a polymer binder. The inorganic solid electrolyte includes a metal that belongs to Group 1 or Group 2 in the Periodic Table, and generally has metal ion (preferably, lithium ion) conductivity but has no electron conductivity.

According to an embodiment of the present disclosure, the inorganic solid electrolyte may be selected from the solid electrolyte materials applied to solid-state secondary batteries, and particular examples of the solid electrolyte materials include a sulfide-based inorganic solid electrolyte, oxide-based inorganic solid electrolyte, or the like.

The sulfide-based inorganic solid electrolyte preferably contains sulfur (S), includes a metal that belongs to Group 1 or Group 2 in the Periodic Table, and has ion conductivity and electron insulating property. For example, a lithium ion conductive inorganic solid electrolyte satisfying the composition represented by the following Chemical Formula 1 may be used.

$$Li_aM_bP_cS_d \qquad (1)$$

wherein M represents an element selected from B, Zn, Si, Cu, Ga and Ge. Each of a-d represents the compositional ratio of each element, wherein a:b:c:d satisfies 1-12: 0-0.2: 1:2-9.

In Chemical Formula 1, the compositional ratio of Li, M, P and S preferably satisfies b=0. More preferably, b=0 and the compositional ratio of a, c and d satisfies a:c:d=1-9:1:3-7. Even more preferably, b=0 and a:c:d=1.5-4:1:3.25-4.5. As described hereinafter, the compositional ratio of each element may be controlled by adjusting the mixing amount of a starting compound when preparing the sulfide-based solid electrolyte.

The sulfide-based inorganic solid electrolyte may be amorphous (vitreous), may be in a crystallized form (vitreous ceramic), or may be in a partially crystallized form. In Li—P—S type glass and Li—P—S type vitreous ceramic, the ratio of $Li_2S$ to $P_2S_5$ is the molar ratio of $Li_2S:P_2O_5$ and may be preferably 65: 35-85:15, more preferably 68: 32-75: 25. When the ratio of $Li_2S$ to $P_2S_5$ is within the abovedefined range, it is possible to obtain higher lithium ion conductivity. The lithium ion conductivity may be preferably $1\times10^{-4}$ S/cm or more, more preferably $1\times10^{-3}$ S/cm or more. Particular examples of such compounds include one obtained by using a composition containing sulfide of an element of Group 13-Group 15.

Particular examples of the sulfide-based inorganic solid electrolyte include $Li_2S$—$P_2S_5$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$LiI$, $Li_2S$—$SiS_2$—$Li_4SiO_4$, $Li_2S$—$SiS_2$—$Li_3PO_4$, $Li_{10}GeP_2S_{12}$, or the like. Particularly, a crystalline and/or amorphous composition including $Li_2S$—$P_2S_5$, $Li_2S$—$GeS_2$—$Ga_2S_3$, $Li_2S$—$GeS_2$—$P_2S_5$, $Li_2S$—$SiS_2$—$P_2S_5$, $Li_2S$—$SiS_2$—$Li_4SiO_4$ or $Li_2S$—$SiS_2$—$Li_3PO_4$ is preferred, since it has high lithium ion conductivity.

Particular examples of the method for preparing a sulfide-based solid electrolyte material by using the above-mentioned compositions include amorphization. For example, such amorphization may include a mechanical milling process and a melt quenching process. Among them, a mechanical milling process is preferred, since it allows treatment at room temperature, and thus simplifies the preparation process.

The oxide-based inorganic solid electrolyte contains an oxygen atom (O), includes a metal that belongs to Group 1 or Group 2 in the Periodic Table, and preferably has ion conductivity and electron insulating property.

Particular examples of the oxide-based inorganic solid electrolyte include $Li_{xa}La_{ya}TiO_3$ [xa=0.3-0.7, ya=0.3-0.7] (LLT), $Li_7La_3Zr_2O_{12}$(LLZ), $Li_{3.5}Zn_{0.25}GeO_4$ having a LISICON (lithium super ionic conductor)-type crystal structure, $LiTi_2P_3O_{12}$ having a NASICON (natrium super ionic conductor)-type crystal structure, $Li_{a+xb+yb}(Al,Ga)_{xb}(Ti,Ge)_{2-xb}Si_{yb}P_{3-yb}O_{12}$ (wherein $0 \le xb \le 1$, $0 \le yb \le 1$), $Li_7La_3Zr_2O_{12}$ having a garnet-type crystal structure.

In addition, a phosphorus-based compound containing Li, P and O is preferred and particular examples thereof include LiPON, LiPOD (wherein D is at least one selected from Ti, V, Cr, Mn, Fe, Co, Ni, Cu, Zr, Nb, Mo, Ru, Ag, Ta, W, Pt, Au, etc.). In addition, LiAON (wherein A is Si, B, Ge, Al, C, Ga, etc.) may be used preferably.

Particularly, $Li_{1+xb+yb}(Al,Ga)_{xb}(Ti,Ge)_{2-xb}Si_{yb}P_{3-yb}O_{12}$ (wherein $0 \le xb \le 1$, $0 \le yb \le 1$) is preferred, since it has high lithium ion conductivity, is chemically stable and can be handled with ease. Such compounds may be used alone or in combination.

The oxide-based solid electrolyte preferably has a lithium ion conductivity of $1\times10^{-6}$ S/cm or more, more preferably $1\times10^{-5}$ S/cm or more, and most preferably $5\times10^{-5}$ S/cm or more.

Binder polymers that may be used in the inorganic solid-state electrolyte coating layer include amide bond-containing polymers, such as polyamide and polyacrylamide; imide bond-containing polymers such as polyimide; urethane bond-containing polymers such as polyurethane; rubber such as nitrile butadiene rubber (NBR), butadiene rubber and butylene rubber; polyacrylates; poly(styrene-butadiene-styrene); or the like.

In addition, the organic solid-state coating layer may include a polar non-crosslinked polymer, oxide-based non-crosslinked polymer, polymer crosslinked structure, or a combination of two or more of them.

Particular examples of the polar non-crosslinked polymers may include, but are not limited to: polyvinyl chloride, polyvinylidene fluoride, polyvinylidene fluoride-co-hexafluoropropylene, polyethylene imine, polymethacrylate, polybutyl acrylate, polyvinyl alcohol, polyvinyl pyrrolidone, polyvinyl acetate, ethylene-co-vinyl acetate, phosphate polymers, polyagitation lysine, polymers containing an ionically dissociatable group, or a combination of two or more of them.

The oxide-based non-crosslinked polymers include polyethylene oxide, polypropylene oxide, polyoxymethylene, polydimethyl siloxane, polyethylene sulfide, derivatives thereof, or a combination of two or more of them, but are not limited thereto.

The polymer crosslinked structures include polymers of a monomer having two or more functional groups or copolymers of a monomer having two or more functional groups with a polymer monomer having one functional group.

Particular examples of the monomer having two or more functional groups include, but are not limited to: trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, ethoxylated bisphenol A dimethacrylate, or a combination of two or more of them.

Particular examples of the monomer having one functional group include, but are not limited to: methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, vinyl fluoride, or a combination of two or more of them.

The polyolefin foam separator may be formed by applying a coating solution containing a foaming agent in a liquid phase of polyolefin to the exterior of an electrode active material layer, followed by drying and foaming, to obtain a foam separator layer. The polyolefin may include polyethylene, polypropylene, or the like. The foaming agent may include at least one selected from the group consisting of azo (—N=N—) compounds, carbonate compounds, hydrazide compounds, nitrile compounds, amine compounds, amide compounds and carbazide compounds.

According to the present disclosure, the insulation coating layer may further include a lithium salt. Such a lithium salt can improve ion conductivity and reaction rate, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic lithium carboxylate and lithium tetraphenylborate.

Figure 4:
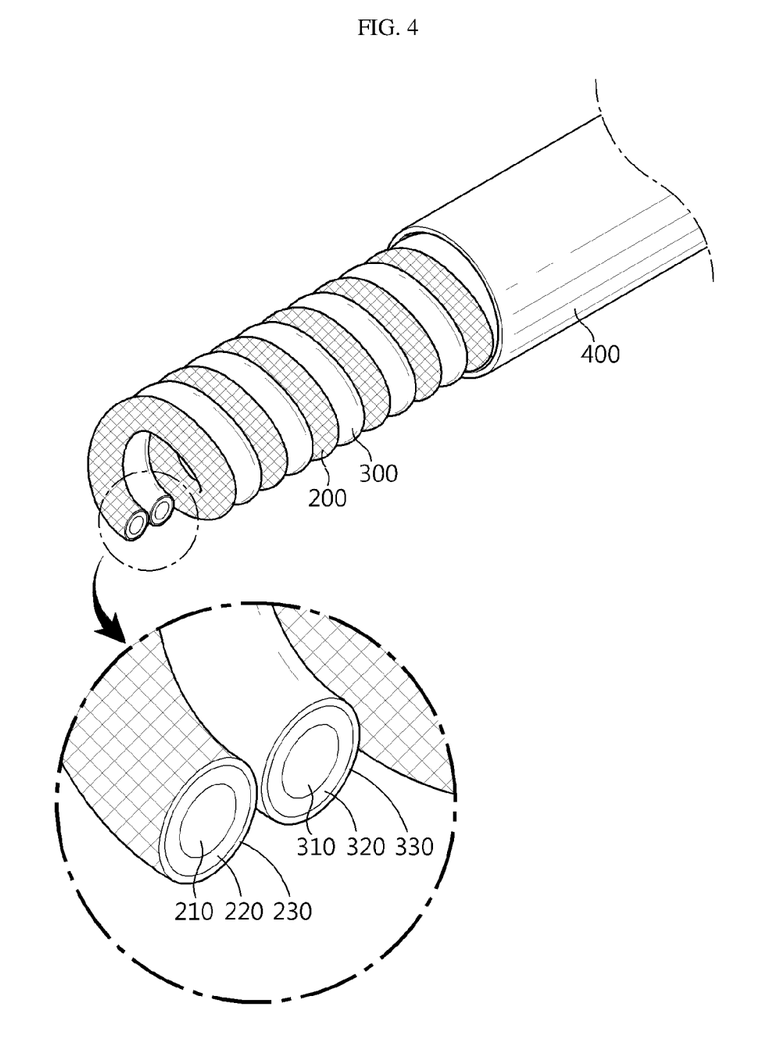
FIG. 4 is a schematic view illustrating the flexible secondary battery according to another embodiment of the present disclosure.

Referring to FIG. 4, the flexible secondary battery according to the present disclosure is provided with a first electrode 200 including a first electrode current collector 210 extended longitudinally, a first electrode active material layer 220 formed on the outside of the first electrode current collector, and a first insulation coating layer 230 formed on the outside of the first electrode active material layer; and a second electrode 300 including a second electrode current collector 310 extended longitudinally, a second electrode active material layer 320 formed on the outside of the second electrode current collector, and a second insulation coating layer 330 formed on the outside of the second electrode active material layer, wherein the first electrode and the second electrode are wound in such a manner that they are disposed alternately in contact with each other. The flexible secondary battery may be provided with a cover member 400 which surrounds the outside of the first electrode and the second electrode.

The cover member is an insulator and is formed to surround the electrode assembly in order to protect the electrodes from moisture in the air and external impact. The cover member may include a conventional polymer resin and particular examples thereof include PVC, HDPE or epoxy resin.

According to an embodiment of the present disclosure, the flexible secondary battery may be further provided with a third insulation coating layer which surrounds both the first electrode and the second electrode. In the same manner as the first insulation coating layer and the second insulation coating layer, the third insulation coating layer may include the porous polymer coating layer, inorganic solid-state electrolyte coating layer, organic solid-state coating layer, or the polyolefin foam separator as described above.

According to the flexible secondary battery provided with the third insulation coating layer, the first electrode and the second electrode are not spaced apart from each other even under continuous bending of the secondary battery, and are maintained as one pair at the originally aligned position, as compared to a flexible secondary battery including a first electrode and a second electrode adjacent thereto and having no insulation coating layer surrounding the electrodes. As a result, it is possible to inhibit the first electrode and the second electrode from being spaced apart from each other due to bending, to prevent the insulation coating layers from being damaged by friction between the first insulation coating layer and the second insulation coating layer provided on the outside of the first electrode and the second electrode, and to prevent a short-circuit between the first electrode and the second electrode.

Referring to FIG. 5-FIG. 8, a first electrode 30 including a first electrode current collector 31 extended longitudinally, a first electrode active material layer 32 formed on the outside of the first electrode current collector 31, and a first insulation coating layer 33 formed on the outside of the first electrode active material layer 32; and a second electrode 40 including a second electrode current collector 41 extended longitudinally, a second electrode active material layer 42 formed on the outside of the second electrode current collector 41, and a second insulation coating layer 43 formed on the outside of the second electrode active material layer 42 are prepared, the first electrode 30, 110 and the second electrode 40, 120 are disposed with a predetermined interval, and then a third insulation coating layer 50, 130 surrounding both electrodes is formed. Then, the first electrode 30, 110 and the second electrode 40, 120 are wound spirally to form the flexible secondary battery 100 shown in FIG. 8, in which the first electrode 30, 110 and the second electrode 40, 120 are disposed alternately according to an embodiment of the present disclosure.

Figure 5:
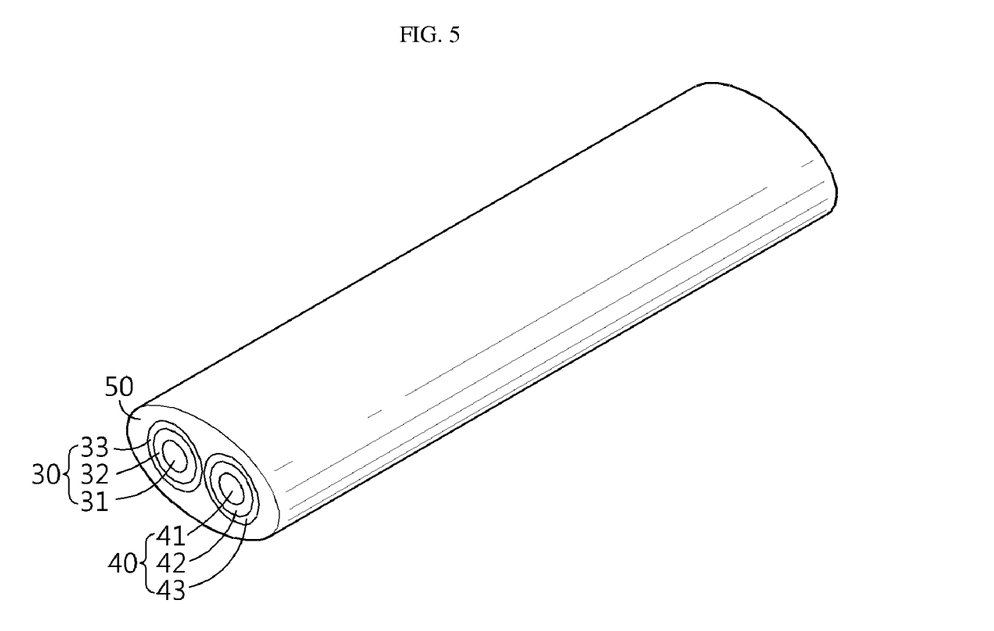
FIG. 5 is a schematic view illustrating the flexible secondary battery according to still another embodiment of the present disclosure.
Figure 6:
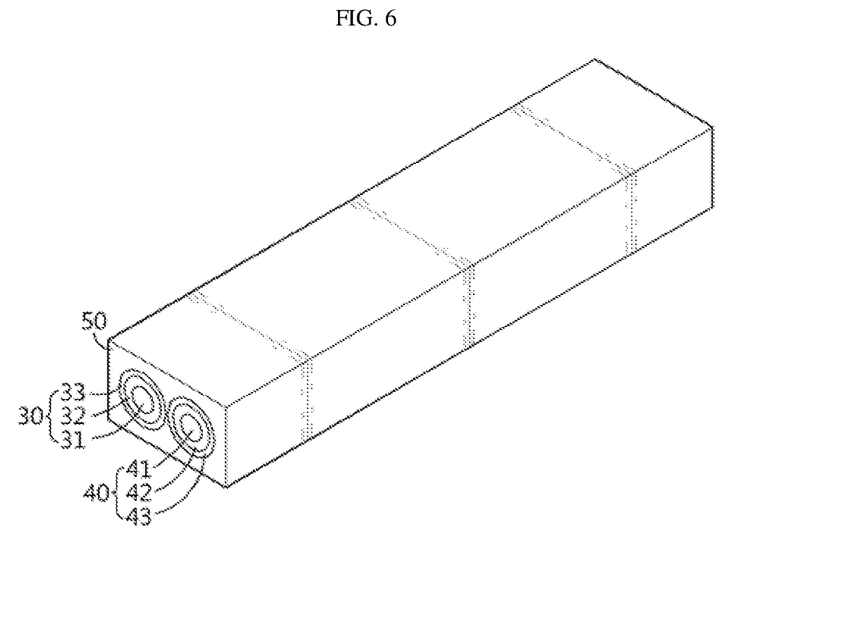
FIG. 6 is a schematic view illustrating the flexible secondary battery according to still another embodiment of the present disclosure.
Figure 7:
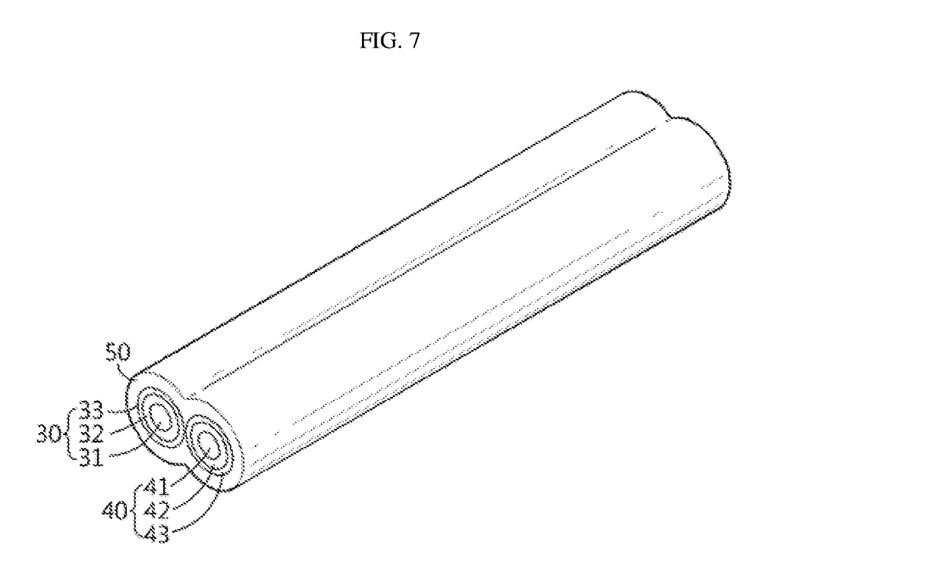
FIG. 7 is a schematic view illustrating the flexible secondary battery according to still another embodiment of the present disclosure.
Figure 8:
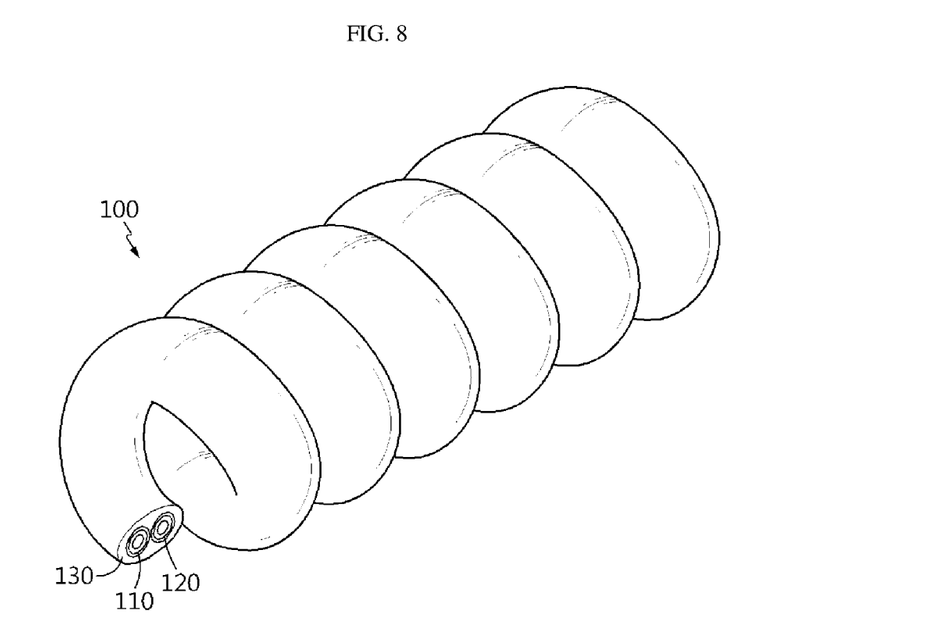
FIG. 8 is a schematic view illustrating the flexible secondary battery according to still another embodiment of the present disclosure.

Particularly, referring to FIG. 5-FIG. 7, the cross-section of the third insulation coating layer 50, 130 may be an elliptical (FIG. 5), rectangular (FIG. 6) or peanut-like shape (FIG. 7) and other shapes, such as a circular shape, square shape or various polygonal shapes including a triangular shape may be used.

Figure 9:
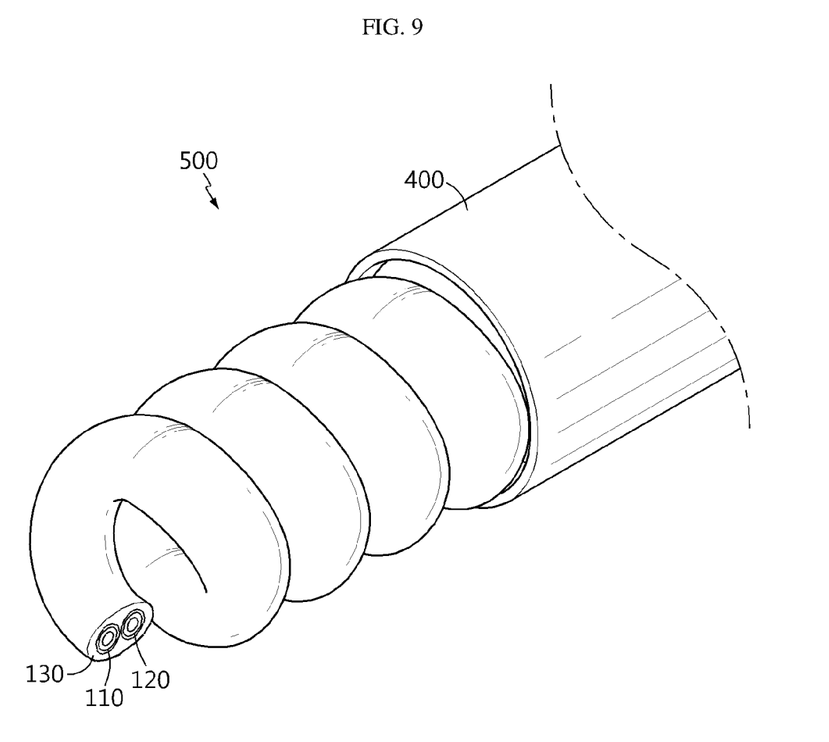
FIG. 9 is a schematic view illustrating the flexible secondary battery according to yet another embodiment of the present disclosure.

Referring to FIG. 9, the flexible secondary battery may be further provided with a cover member 400 surrounding the exterior of the third insulation coating layer 50, 130.

Hereinafter, the method for manufacturing the flexible secondary battery as described above will be explained.

First, an active material layer is formed on the surface of a first electrode current collector having an elongated wire shape whose cross-section perpendicular to the longitudinal direction has a circular, elliptical or a polygonal shape.

Any conventional coating processes may be used for forming the first electrode active material layer. Particularly, it is preferred to form the first electrode active material layer by using a continuous or discontinuous extrusion coating process in which electrode slurry containing an active material is passed through an extruder. Herein, the active material layer may be coated intermittently so as to maintain a predetermined interval.

Next, a first insulation coating layer is formed to surround the first electrode active material layer.

There is no particular limitation in methods for forming the first insulation coating layer. The first insulation coating layer may be applied through various processes applicable in the art by using an insulation coating layer composition (coating solution) containing materials for forming the insulation coating layer. For example, it is possible to use a dip coating or extrusion coating process. Considering the characteristics of a linear flexible secondary battery, an extrusion coating process facilitates manufacture of the battery.

Figure 10:
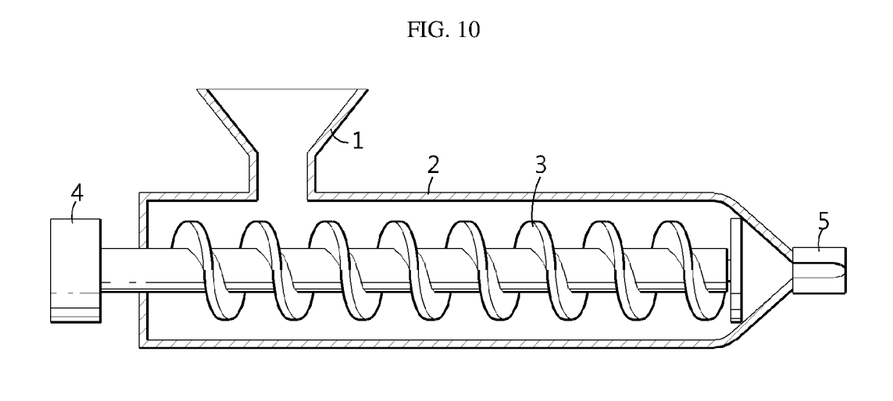
FIG. 10 is a schematic view illustrating an extruder.

For example, in the case of the extrusion coating process, it performs coating continuously by extruding a coating solution onto the outer surface of a substrate through an extruder, and thus has little limitation in length of the substrate to be coated and allows continuous coating on a substrate having a uniform shape. Referring to FIG. 10, the extruder generally includes a hopper 1, cylinder 2 and a die 5. A general extrusion coating process includes introducing a coating material to the hopper of the extruder, allowing the cylinder to maintain a predetermined temperature, and rotating the screw 3 in the cylinder 2, while the coating material is molten, to push out the coating solution and to allow the coating solution to pass through the die 5 mounted in front of the cylinder so that it may be coated on the substrate. The flexible secondary battery has a characteristic shape in that it is elongated in the longitudinal direction as compared to its horizontal section and has a desired horizontal section. Thus, it is suitable to apply a continuous coating process based on extrusion coating.

The electrode slurry is introduced to the hopper 1 of the extruder and the screw 3 in the cylinder is rotated to perform mixing and to push out the electrode slurry so that the electrode slurry may pass through the die 5 mounted in front of the cylinder 2 and may be extruded and coated onto the current collector supplied to the extruder, thereby providing an electrode which is the first electrode (anode or cathode) and the second electrode (cathode or anode) extended longitudinally. The current collector for forming the electrode may have a wire-like shape. The type of a die depending on the shape of a current collector is not particularly limited. However, when the current collector has a wire-like shape, it may be passed through a pipe-like O-die (see FIG. 11) so that the outer surface of the current collector may be coated with the electrode slurry. The electrode slurry injected to the extruder is supplied through a coating material supplying unit 11 and discharged through the O-die 10. The discharged electrode slurry is extrusion coated on the wire-like current collector 12 inserted through the lateral surface of the O-die. Herein, it is possible to control the thickness of the coating layer with ease by adjusting the concentration of electrode slurry, extrusion rate or the line speed (feed rate to the extruder) of the current collector.

Then, the second electrode provided with the second insulation coating layer is prepared in the same manner as the method for manufacturing the first electrode, except that an active material for the electrode opposite to the electrode including the above-mentioned active material layer is used. For example, each of the first insulation coating layer and the second insulation coating layer may have a thickness of 5-150 μm.

After that, the first electrode and the second electrode are wound spirally in the longitudinal direction while they are in contact with each other to form an electrode assembly in which the first electrode and the second electrode are disposed alternately on the same circumferential surface.

Then, the obtained electrode assembly is surrounded with a cover member to obtain a flexible secondary battery. The cover member is an insulator and is formed on the outermost surface in order to protect the battery from moisture in the air and external impact. The cover member may include a conventional polymer resin and particular examples thereof include polyvinyl chloride (PVC), high-density polyethylene (HDPE) or epoxy resin.

Figure 11:
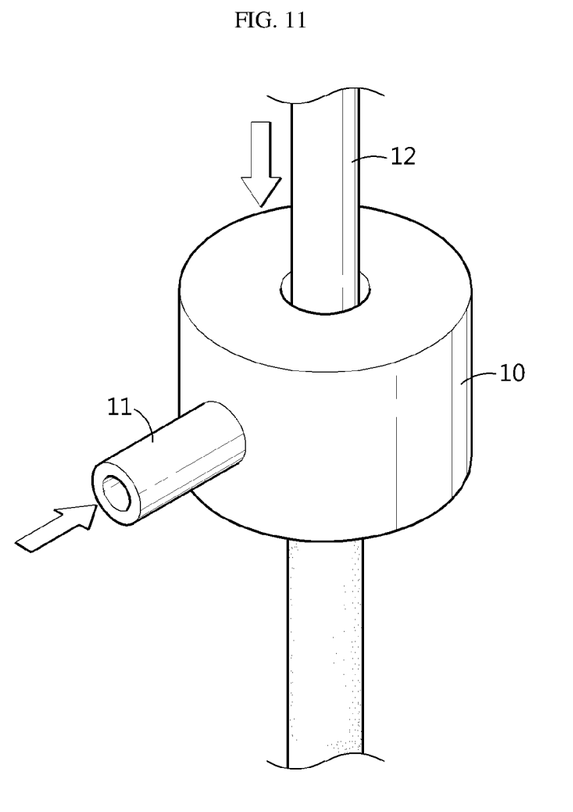
FIG. 11 shows extrusion coating of a wire shape using an O-die.

According to an embodiment of the present disclosure, the flexible secondary battery may be further provided with a third insulation coating layer surrounding both the first electrode and the second electrode. Herein, the third insulation coating layer may be formed by forming two holes in the extruder as shown in FIG. 11 so that two coating substrates may be introduced to the extruder, introducing the first electrode and the second electrode to each of the holes and introducing the third insulation coating layer material as the coating material.

MODE FOR DISCLOSURE

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

A mixture of natural graphite/acetylene black/PVDF=70/5/25 was mixed with N-methylpyrrolidone (NMP) as a solvent to obtain slurry for an anode active material, which, in turn, was coated onto a wire-like current collector made of copper and having a diameter of 125 μm, thereby forming an anode active material layer.

A mixture of $LiCoO_2$/acetylene black/PVDF=70/5/25 was mixed with N-methylpyrrolidone (NMP) as a solvent to obtain slurry for a cathode active material, which, in turn, was coated onto a wire-like current collector made of aluminum and having a diameter of 125 μm, thereby forming a cathode active material layer.

Polyethylene oxide (PEO) (weight average molecular weight (Mw)=4,000,000 g/mol) was dissolved in acetonitrile (AN) as a solvent to prepare a 4 wt % PEO solution, and lithium bis(fluorosulfonyl) imide (LiFSI, $(FSO_2)_2NLi$) as a lithium salt was added thereto to a molar ratio of [EO]/[$Li^+$]= 20/1. Then, the resultant mixture was agitated over night at 70° C. so that PEO and lithium salt might be dissolved sufficiently in the PEO solution.

In addition, in order to obtain a polymer crosslinked structure, polyethylene glycol diacrylate (PEGDA) having two functional groups (weight average molecular weight (Mw)=575) and benzoyl peroxide (BPO) as an initiator were introduced to the lithium salt solution and agitated sufficiently to prepare a composition for an insulation coating layer. Herein, PEGDA was used in an amount of 20 parts by weight based on 100 parts by weight of PEO and BPO was used in an amount of 1 part by weight based on 100 parts by weight of PEGDA.

Then, the prepared composition for forming an insulation coating layer was coated onto each of the anode active material layer and the cathode active material layer. The coating was carried out through extrusion coating.

Particularly, the composition for forming an insulation coating layer was introduced to the hopper of an extruder. The cylinder of the extruder was maintained at a temperature of 50° C. and the screw rotation speed was maintained at 60-70 rpm. The current collector having the anode active material layer was supplied to the O-die (see FIG. 11) of the extruder at a rate of 3 m/minute so that the outer surface of the anode active material layer might be extrusion coated with the composition for forming an insulation coating layer. After that, the coating composition was dried in the chamber of a dryer at 100° C. and subjected to vacuum drying at the same temperature for 12 hours to obtain an anode (first electrode) provided with a first insulation coating layer. Herein, the first insulation coating layer had a thickness of about 20 μm.

The same method for manufacturing an anode as described above was used to obtain a cathode (second electrode) having a second insulation coating layer formed on the outer surface thereof, except that the current collector having the cathode active material layer was used.

Then, while the prepared anode and cathode were allowed to be in contact with each other, they were wound spirally in the longitudinal direction to form a spring-shaped electrode assembly including the anode and the cathode disposed alternately on the same circumferential surface. The obtained electrode assembly was surrounded with a cover member made of polyvinyl chloride (PVC) resin to obtain a flexible secondary battery.

Example 2

A mixture of natural graphite/acetylene black/PVDF=70/5/25 was mixed with N-methylpyrrolidone (NMP) as a solvent to obtain slurry for an anode active material, which, in turn, was coated onto a wire-like current collector made of copper and having a diameter of 125 μm, thereby forming an anode active material layer.

A mixture of $LiCoO_2$/acetylene black/PVDF=70/5/25 was mixed with N-methylpyrrolidone (NMP) as a solvent to obtain slurry for a cathode active material, which, in turn, was coated onto a wire-like current collector made of aluminum and having a diameter of 125 μm, thereby forming a cathode active material layer.

Polyethylene oxide (PEO) (weight average molecular weight (Mw)=4,000,000 g/mol) was dissolved in acetonitrile (AN) as a solvent to prepare a 4 wt % PEO solution, and lithium bis(fluorosulfonyl) imide (LiFSI, $(FSO_2)_2NLi$) as a lithium salt was added thereto to a molar ratio of [EO]/[$Li^+$]= 20/1. Then, the resultant mixture was agitated over night at 70° C. so that PEO and lithium salt might be dissolved sufficiently in the PEO solution.

In addition, in order to obtain a polymer crosslinked structure, polyethylene glycol diacrylate (PEGDA) having two functional groups (weight average molecular weight (Mw)=575) and benzoyl peroxide (BPO) as an initiator were introduced to the lithium salt solution and agitated sufficiently to prepare a composition for an insulation coating layer. Herein, PEGDA was used in an amount of 20 parts by weight based on 100 parts by weight of PEO and BPO was used in an amount of 1 part by weight based on 100 parts by weight of PEGDA.

Then, the prepared composition for forming an insulation coating layer was coated onto each of the anode active material layer and the cathode active material layer. The coating was carried out through extrusion coating.

Particularly, the composition for forming an insulation coating layer was introduced to the hopper of an extruder. The cylinder of the extruder was maintained at a temperature of 50° C. and the screw rotation speed was maintained at 60-70 rpm. The current collector having the anode active material layer was supplied to the O-die (see FIG. 11) of the extruder at a rate of 3 m/minute so that the outer surface of the anode active material layer might be extrusion coated with the composition for forming an insulation coating layer. After that, the coating composition was dried in the chamber of a dryer at 100° C. and subjected to vacuum drying at the same temperature for 12 hours to obtain an anode (first electrode) provided with a first insulation coating layer. Herein, the first insulation coating layer had a thickness of about 20 μm.

The same method for manufacturing an anode as described above was used to obtain a cathode (second electrode) having a second insulation coating layer formed on the outer surface thereof, except that the current collector having the cathode active material layer was used.

Then, while the prepared anode and cathode were disposed with a predetermined interval, a third insulation coating layer surrounding both the anode and the cathode was formed through extrusion coating.

Particularly, the composition for forming an insulation coating layer was introduced to the hopper of the extruder, the cylinder of the extruder was maintained at a temperature of 50° C. and the screw rotation speed was maintained at 60-70 rpm. The anode and the cathode was supplied to the O-die (see FIG. 11) of the extruder having two holes (inlets) spaced apart from each other by a predetermined distance at a rate of 3 m/minute so that the outer surfaces of the anode and cathode might be extrusion coated totally with the composition for forming an insulation coating layer. After that, the coating composition was dried in the chamber of a dryer at 100° C. and subjected to vacuum drying at the same temperature for 12 hours to form the third insulation coating layer surrounding both the anode and the cathode.

Then, the anode and the cathode having the third insulation coating layer were wound spirally together in the longitudinal direction to form a spring-shaped electrode assembly including the anode and the cathode disposed alternately on the same circumferential surface. The obtained electrode assembly was surrounded with a cover member made of polyvinyl chloride (PVC) resin to obtain a flexible secondary battery.

What is claimed is:

1. A flexible secondary battery comprising:
   a first electrode comprising a first electrode current collector extended longitudinally, a first electrode active material layer formed on an outside of the first electrode current collector, and a first insulation coating layer formed on an outside of the first electrode active material layer; and
   a second electrode comprising a second electrode current collector extended longitudinally, a second electrode active material layer formed on an outside of the second electrode current collector, and a second insulation coating layer formed on an outside of the second electrode active material layer,
   wherein the first electrode and the second electrode are helically wound in contact with each other such that they are disposed alternately in parallel with each other on the same circumference,
   wherein the flexible secondary battery further comprises a third insulation coating layer completely surrounding outside surfaces of both the first electrode and the second electrode and wherein the third insulation coating layer is a helically wound structure in contact with the first electrode and the second electrode so that the first electrode and the second electrode are not spaced apart from each other even under continuous bending of the secondary battery and are maintained as one pair at an originally aligned position,
   wherein each of the first insulation coating layer, the second insulation coating layer, and the third insulation coating layer comprises a polyolefin foam separator.

2. The flexible secondary battery according to claim 1, wherein each of the first electrode current collector and the second electrode current collector independently comprises: stainless steel; aluminum; nickel; titanium; baked carbon; copper; stainless steel surface-treated with carbon, nickel, titanium or silver; aluminum-cadmium alloy; non-conductive polymer surface-treated with a conductive material; conductive polymer; metal paste containing metal powder of Ni, Al, Au, Ag, Al, Pd/Ag, Cr, Ta, Cu, Ba or ITO; or carbon paste containing carbon powder of graphite, carbon black or carbon nanotube.

3. The flexible secondary battery according to claim 1, wherein the first electrode is a cathode or anode and the second electrode is an anode or cathode corresponding to the first electrode.

4. The flexible secondary battery according to claim 1, wherein when the first electrode is an anode and the second electrode is a cathode, the first electrode active material comprises any one active material particle selected from the group consisting of natural graphite, artificial graphite or carbonaceous materials; metals (Me) of lithium-containing titanium composite oxide (LTO), Si, Sn, Li, Zn, Mg, Cd, Ce, Ni or Fe; alloys including the metal (Me); oxides (MeOx) of the metals (Me); and composites of the metals (Me) with carbon, or a combination of two or more of them, and
   the second electrode active material comprises any one active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic fraction of an element forming the oxide and $0 \leq x < 0.5$, $0 \leq y < 0.5$, $0 \leq z < 0.5$ and $0 < x+y+z \leq 1$), or a combination of two or more of them.

5. The flexible secondary battery according to claim 1, wherein a cross-section of the third insulation coating layer is an elliptical shape or a rectangular shape.

6. The flexible secondary battery according to claim 1, wherein each of the first electrode current collector and the second electrode current collector independently comprises non-conductive polymer surface-treated with a conductive material.

7. The flexible secondary battery according to claim 6, wherein the conductive material is selected from the group consisting of polyacetylene, polyaniline, polypyrrole, polythiophene, polysulfur nitride, indium tin oxide (ITO), copper, silver, palladium and nickel.

8. The flexible secondary battery according to claim 1, wherein each of the first electrode current collector and the second electrode current collector independently comprises conductive polymer.

9. The flexible secondary battery according to claim 8, wherein the conductive polymer is selected from the group consisting of polyacetylene, polyaniline, polypyrrole, polythiophene and polysulfur nitride.

10. The flexible secondary battery according to claim 1, wherein when the battery is bent, the first electrode and the second electrode move within the same bending radius.

11. The flexible secondary battery according to claim 1, wherein the battery does not include an additional separator or electrolyte layer between the first electrode and the second electrode.

12. The flexible secondary battery according to claim 1, further comprising a cover member surrounding an exterior of the third insulation coating layer.

13. The flexible secondary battery according to claim 12, wherein the cover member comprises PVC, HDPE or epoxy resin.

14. The flexible secondary battery according to claim 1, wherein the polyolefin foam separator of each of the first insulation coating layer, the second insulation coating layer, and the third insulation coating layer is formed by applying a coating solution containing a foaming agent in a liquid phase of polyolefin to an exterior of an electrode active material layer, followed by drying and foaming.

15. The flexible secondary battery according to claim 1, wherein a cross-section of the third insulation coating layer is a peanut-like shape.

16. A flexible secondary battery comprising:
a first electrode comprising a first electrode current collector extended longitudinally, a first electrode active material layer formed on an outside of the first electrode current collector, and a first insulation coating layer formed on an outside of the first electrode active material layer; and
a second electrode comprising a second electrode current collector extended longitudinally, a second electrode active material layer formed on an outside of the second electrode current collector, and a second insulation coating layer formed on an outside of the second electrode active material layer,
wherein the first electrode and the second electrode are wound into parallel spring shapes of the same circumference that are in contact with each other,
wherein the flexible secondary battery further comprises a third insulation coating layer completely surrounding outside surfaces of both the first electrode and the second electrode, and wherein the third insulation coating layer is a helically wound structure in contact with the first electrode and the second electrode so that the first electrode and the second electrode are not spaced apart from each other even under continuous bending of the secondary battery and are maintained as one pair at an originally aligned position,
wherein the first electrode and the second electrode on which the third insulating coating layer is formed are wound in a helical shape, and the first and second electrodes contact each other on one side only, whereas the other sides are spaced by the third insulating coating layer.

17. A flexible secondary battery comprising:
a first electrode comprising a first electrode current collector extended longitudinally, a first electrode active material layer formed on an outside of the first electrode current collector, and a first insulation coating layer formed on an outside of the first electrode active material layer; and
a second electrode comprising a second electrode current collector extended longitudinally, a second electrode active material layer formed on an outside of the second electrode current collector, and a second insulation coating layer formed on an outside of the second electrode active material layer,
wherein the first electrode and the second electrode are helically wound in contact with each other such that they are disposed alternately in parallel with each other on the same circumference,
wherein the flexible secondary battery further comprises a third insulation coating layer completely surrounding outside surfaces of both the first electrode and the second electrode, and wherein the third insulation coating layer is a helically wound structure in contact with the first electrode and the second electrode so that the first electrode and the second electrode are not spaced apart from each other even under continuous bending of the secondary battery and are maintained as one pair at an originally aligned position
wherein each of the first insulation coating layer, the second insulation coating layer, and the third insulation coating layer comprises a combination of oxide-based non-crosslinked polymer and polymer crosslinked structure.

* * * * *